(12) United States Patent
Kazi et al.

(10) Patent No.: US 11,623,702 B1
(45) Date of Patent: Apr. 11, 2023

(54) STAND ON MOWER OPERATOR STATION

(71) Applicant: DEERE & COMPANY, Moline, IL (US)

(72) Inventors: Mohseen Kazi, Pune (IN); Franklin P. Lewis, Apex, NC (US); Saravanan Deenadayalan, Pune (IN); Prasadkumar Bhangale, Cary, NC (US); Curtis D. Ayers, Willow Spring, NC (US)

(73) Assignee: DEERE & COMPANY, Moline, IL (US)

( * ) Notice: Subject to any disclaimer, the term of this patent is extended or adjusted under 35 U.S.C. 154(b) by 39 days.

(21) Appl. No.: 17/448,915

(22) Filed: Sep. 27, 2021

(51) Int. Cl.
*B62D 51/00* (2006.01)
*B62D 51/02* (2006.01)
*A01D 67/00* (2006.01)
*A01D 101/00* (2006.01)

(52) U.S. Cl.
CPC .......... *B62D 51/001* (2013.01); *A01D 67/00* (2013.01); *B62D 51/02* (2013.01); *A01D 2101/00* (2013.01)

(58) Field of Classification Search
CPC ...... B62D 51/001; B62D 51/02; A01D 67/00; A01D 67/005; A01D 2101/00
See application file for complete search history.

(56) References Cited

U.S. PATENT DOCUMENTS

| | | | |
|---|---|---|---|
| 5,653,466 A | 8/1997 | Berrios | |
| 5,809,755 A | 9/1998 | Velke et al. | |
| 6,327,839 B1 | 12/2001 | Velke et al. | |
| 6,490,849 B1 | 12/2002 | Scag et al. | |
| 6,782,964 B1 | 8/2004 | Korthals et al. | |
| 7,267,369 B2 | 9/2007 | Gallagher et al. | |
| 7,458,588 B2* | 12/2008 | Kallevig | B62B 5/08 280/727 |
| 8,141,886 B1 | 3/2012 | Sugden et al. | |
| 8,262,104 B2 | 9/2012 | Kallevig et al. | |
| 8,561,382 B2 | 10/2013 | Gamble et al. | |
| 9,731,760 B2 | 8/2017 | Ito et al. | |
| D896,848 S | 9/2020 | Moore et al. | |
| D897,375 S | 9/2020 | Moore et al. | |
| D910,087 S | 2/2021 | Moore et al. | |
| 2009/0302562 A1* | 12/2009 | Kallevig | A01D 34/64 280/32.7 |
| 2011/0277433 A1* | 11/2011 | Sugden | B60N 2/544 296/65.02 |
| 2021/0307251 A1* | 10/2021 | Fisher | B62D 11/005 |

FOREIGN PATENT DOCUMENTS

| | | | |
|---|---|---|---|
| EP | 3502039 A1 * | 6/2019 | |
| EP | 3696134 A9 * | 10/2020 | |

OTHER PUBLICATIONS

Borsari, Industrial Truck With a Driver's Platform Containing Driver Station, Jun. 26, 2019, EPO, EP 3502039 A1, Machine Translation of Description (Year: 2019).*

* cited by examiner

*Primary Examiner* — Paul N Dickson
*Assistant Examiner* — Matthew D Lee

(57) ABSTRACT

A stand on mower operator station includes a leaning pad having an upright position on a stand on mower, and a foot platform connected to the leaning pad. A dampening member allows the leaning pad and foot platform to move vertically together and absorbs shocks encountered by the stand on mower.

9 Claims, 5 Drawing Sheets

STAND ON MOWER OPERATOR STATION

FIELD OF THE INVENTION

This invention relates to grass mowing machines, and specifically to operator stations for stand on mowers.

BACKGROUND OF THE INVENTION

Stand on mowers have been used for commercial mowing applications where an operator can easily step on and off a foot platform at the rear of the mower. Stand on mowers have a mowing deck with multiple cutting blades positioned in front of the operator station. Efforts to improve operator comfort while operating stand on mowers include leaning pads which upright cushions in front of the operator's legs. Stand on mowers also may include suspensions for foot platforms, and pivoting foot platforms. For example, U.S. Pat. No. 6,782,964 relates to a foot platform that is mounted with springs to cushion the operator. U.S. Pat. No. 8,262,104 relates to a stand on mower with a thigh pad pivotally linked to a foldable foot platform. U.S. Pat. No. 8,561,382 relates to a foot platform that is pivotally connected to the frame and a spring biasing the platform upward. There is a need to further improve operator comfort, improve ride quality, reduce vibration and shock to the operator, and reduce leaning by the operator.

SUMMARY OF THE INVENTION

A stand on mower operator station includes a leaning pad having an upright position on a stand on mower, and a dampening member connecting the leaning pad to a frame member of the stand on mower for shock absorption by providing limited vertical movement of the leaning pad. The operator station also may include a foot platform connected to the leaning pad.

DESCRIPTION OF THE PREFERRED EMBODIMENT

Figure 1:
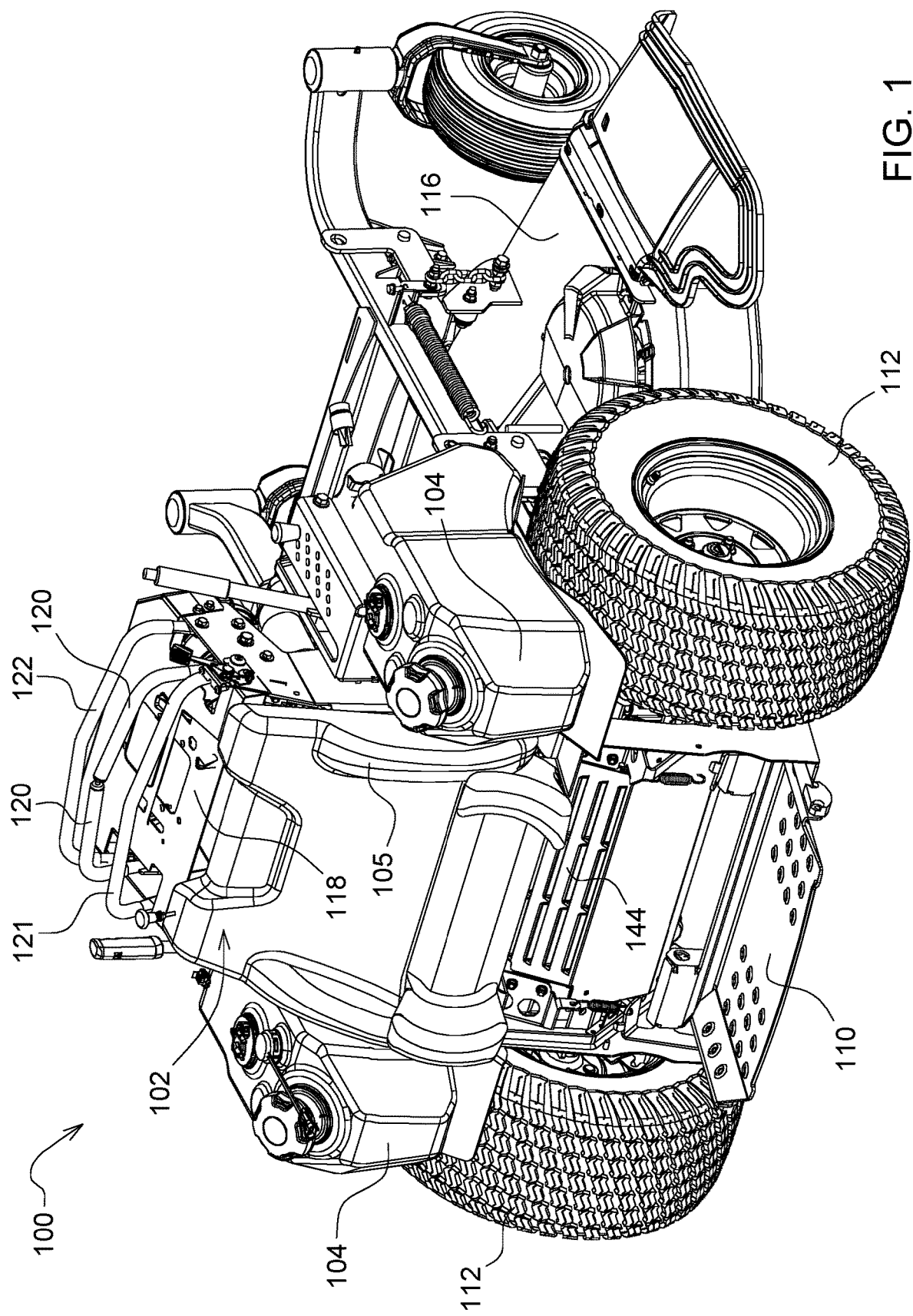
FIG. 1 is a rear perspective view of a stand on mower with an operator station according to a first embodiment of the invention.

In one embodiment shown in FIG. 1, stand on mower 100 may have an operator station 102 behind the engine and substantially between the rear traction drive wheels 112. The stand on mower may include a fuel storage tank 104 above each rear wheel, and mower deck 116 under the frame and in front of the rear wheels. Control console 118 may be located in front of the operator station. Control levers 120 may be pivotably mounted to the left and right sides of the control console support frame 134. Each control lever may control the forward and reverse rotation of one of the rear wheels, and each control lever may operate independently so that one of the control levers may be in a forward drive position and the other may be in a reverse drive position. Stationary front reference bar 122 may be positioned directly in front of control levers 120 to control speed and reduce fatigue from control lever operation, and stationary rear reference bar 121 may help ease reverse operation.

Figure 2A:
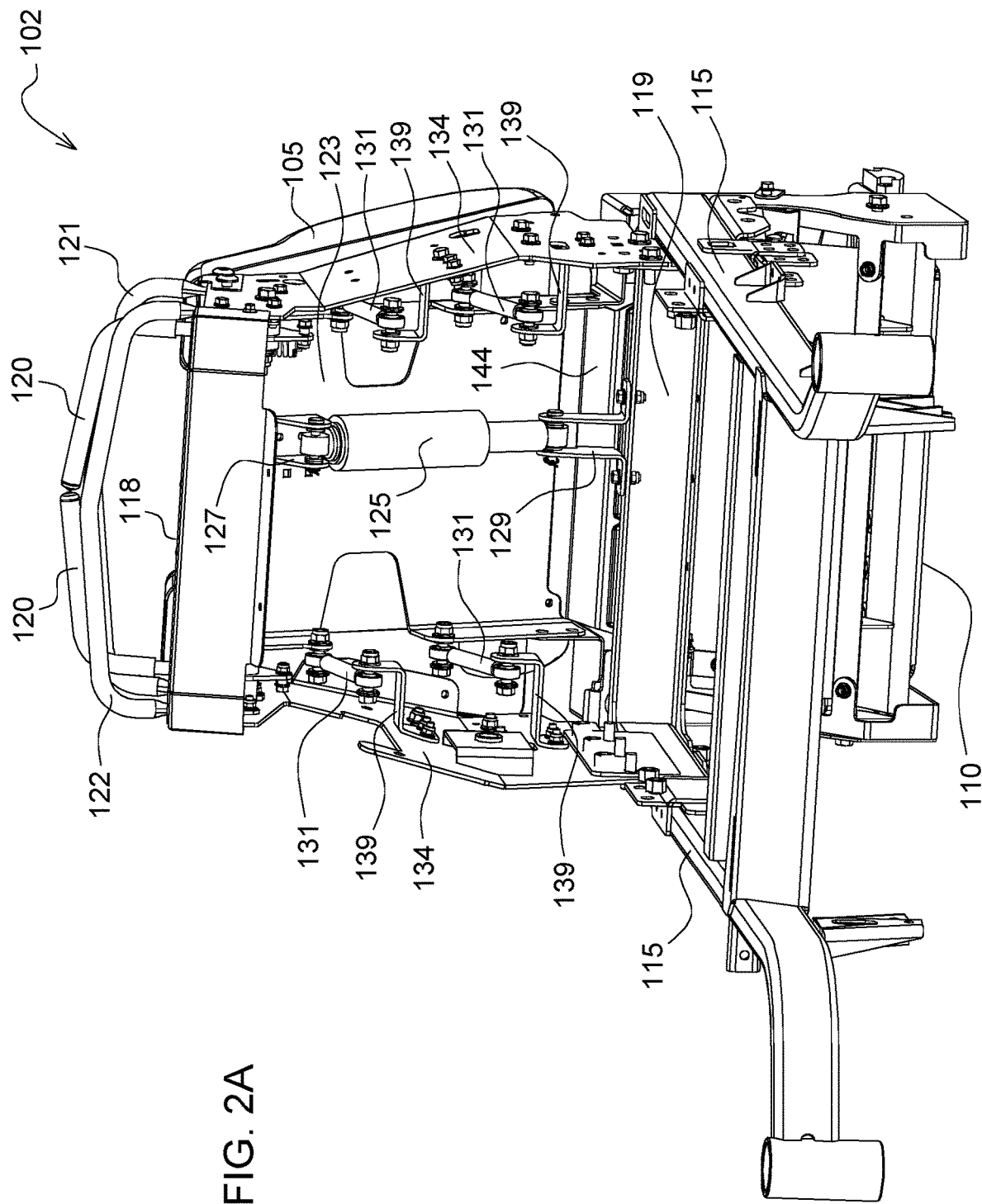
FIG. 2A is a front perspective view of a stand on mower operator station in a first raised position according to a first embodiment of the invention.
Figure 2B:
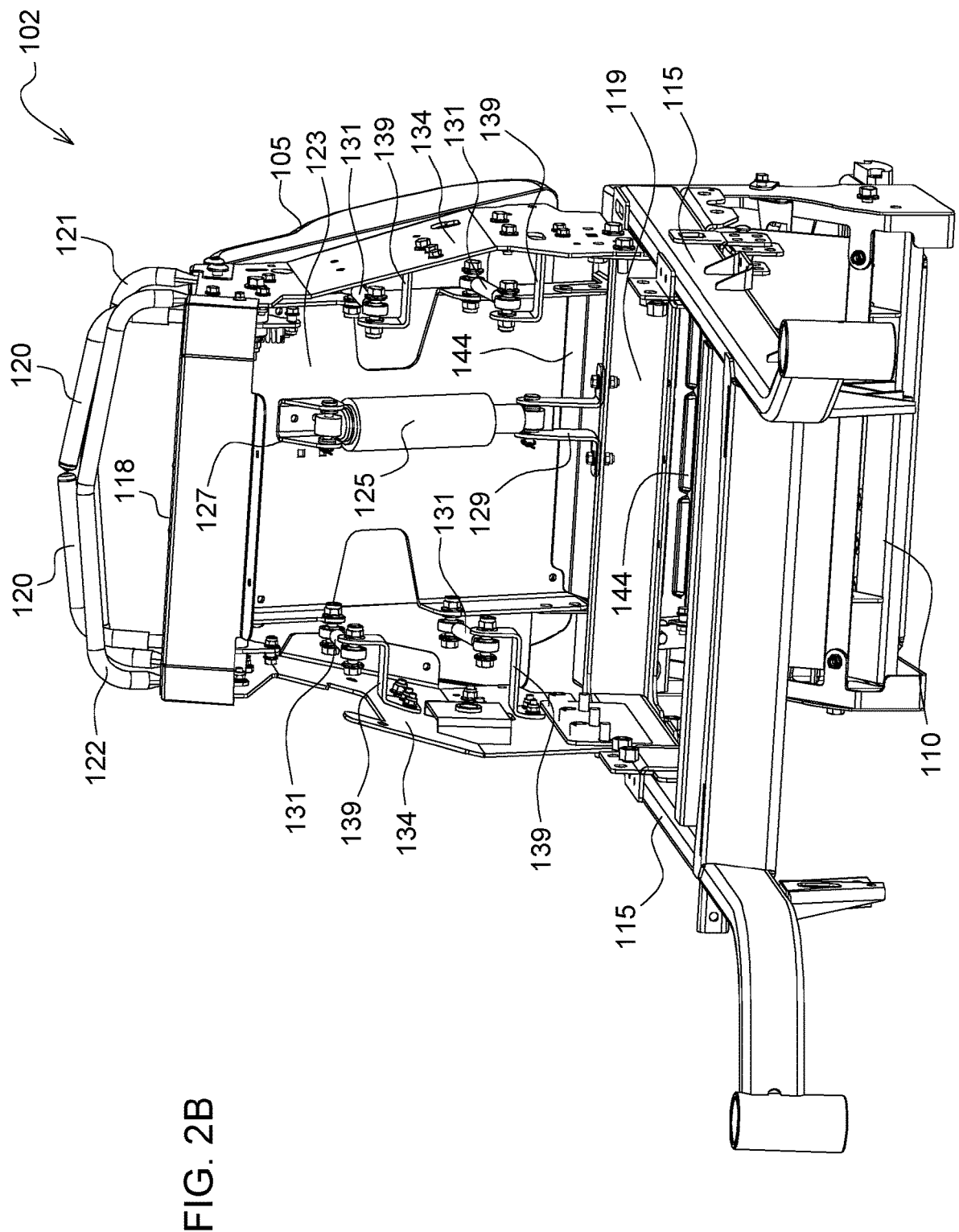
FIG. 2B is a front perspective view of a stand on mower operator station in a second lowered position according to a first embodiment of the invention.

In one embodiment shown in FIGS. 2A and 2B, stand on mower operator station 102 may include dampening member 125 allowing limited vertical movement of leaning pad 105 relative to the vehicle frame. The leaning pad is a generally upright member in front of the operator's legs. The dampening member may include a coil spring over shock absorber. A first or upper end of dampening member 125 may be connected to plate or panel 123 attached to the front face of leaning pad 105. A second or lower end may be connected to the vehicle frame and preferably frame cross member 119 which may extend between longitudinal frame members 115. The dampening member may provide shock absorption and reduce vertical impact forces to the leaning pad and operator when the stand on mower encounters bumps on the ground surface.

In one embodiment shown in FIGS. 2A and 2B, stand on mower operator station 102 also may include a plurality of linkages such as pivot arms 131 for stabilizing the vertical motion of leaning pad 105. For example, each pivot arm 131 may have a first end pivotably connected to plate or panel 123 on the front face of leaning pad 105, and a second end pivotably connected to a bracket 139 attached to the vehicle frame and preferably to control console support frame 134.

In one embodiment shown in FIGS. 2A and 2B, stand on mower operator station 102 may include dampening member 125 that also provides limited vertical movement of foot platform 110 along with leaning pad 105. Plate or panel 123 may be connected to a bracket for foot platform 110. For example, the connection may be provided by vented plate 144, positioned in front of the engine. The foot platform may pivot between a deployed and storage position.

In one embodiment, FIG. 2A shows stand on mower operator station 102 in a first raised position wherein dampening member 125 is extended, and FIG. 2B shows stand on mower operator station 102 in a second lowered position wherein dampening member 125 is retracted.

Figure 3A:
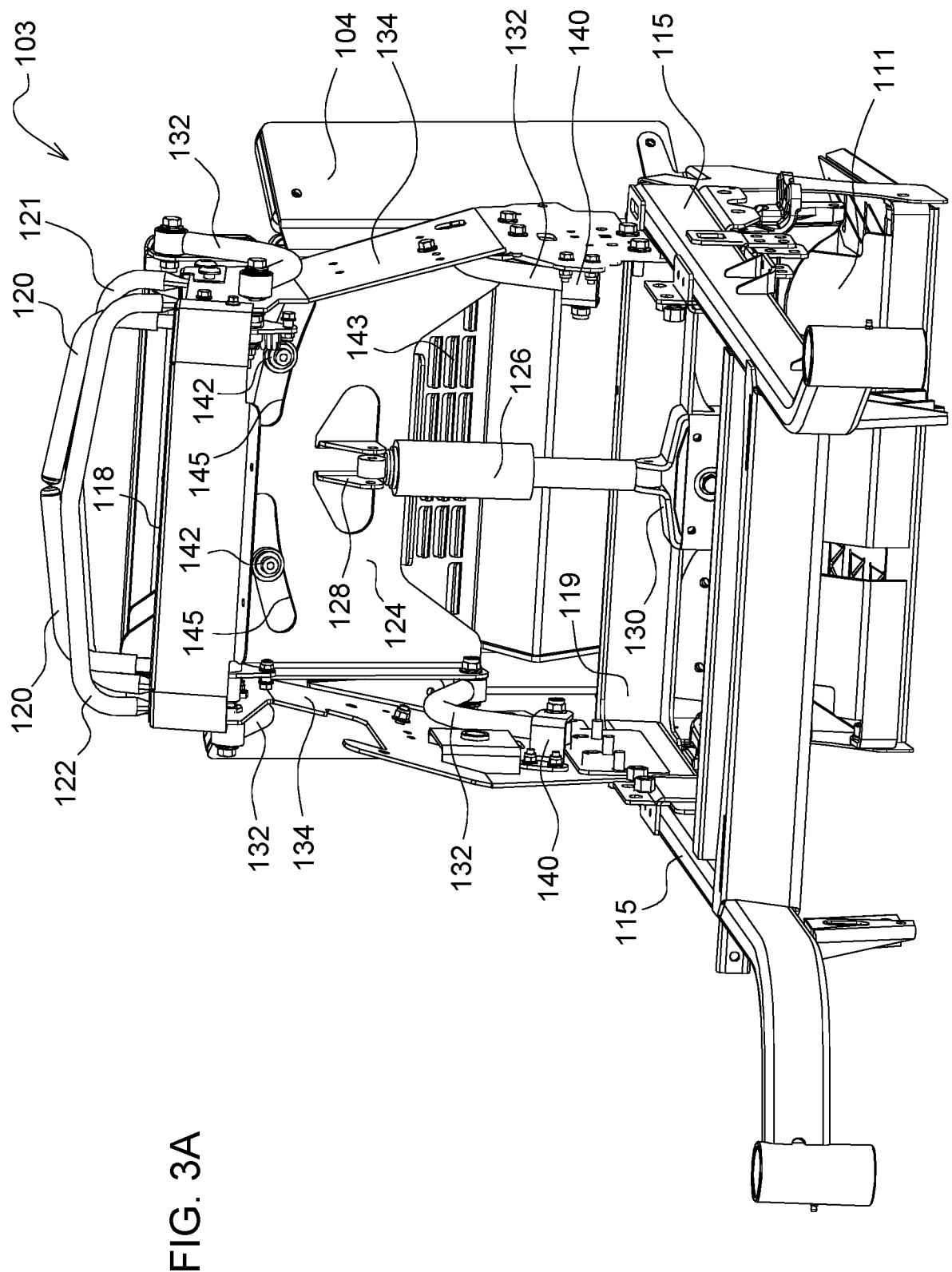
FIG. 3A is a front perspective view of a stand on mower operator station in a first unpivoted position according to a second embodiment of the invention.
Figure 3B:
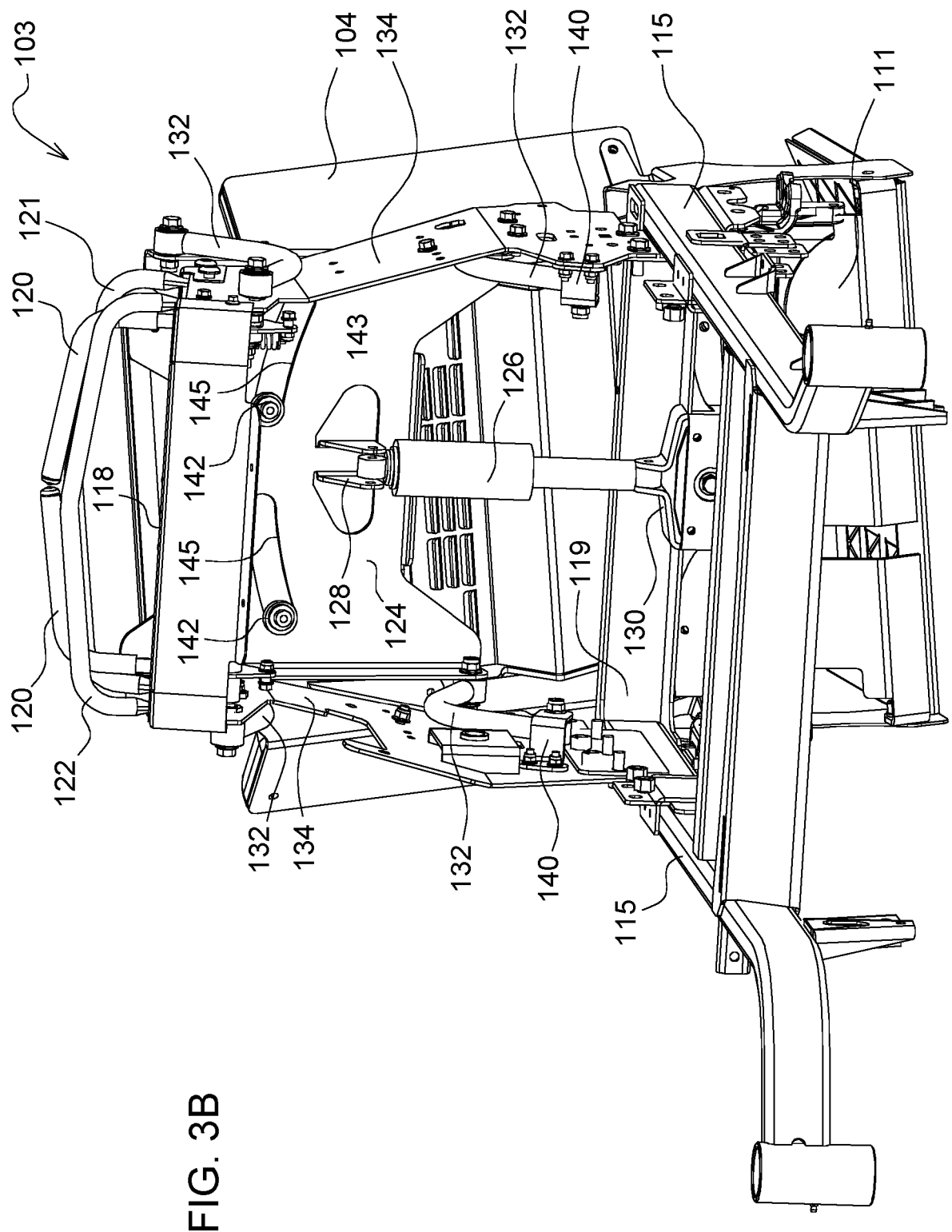
FIG. 3B is a front perspective view of a stand on mower operator station in a second pivoted position according to a second embodiment of the invention.

In a second embodiment shown in FIGS. 3A and 3B, stand on mower operator station 103 may include leaning pad 104 and foot platform 111 that can pivot on a horizontal axis of the stand on mower when operating on side hills. When the leaning pad and foot platform pivot, the operator may remain in a vertical erect position. For example, leaning pad 104 may be pivotably attached to plate or panel 124. For example, followers or rollers 142 on leaning pad 104 may be retained in arcuate slots 145 in plate 124, allowing the leaning pad to pivot up to about 15 degrees each way relative to the plate.

The second embodiment shown in FIGS. 3A and 3B also may include dampening member 126 which may be a coil spring over shock absorber. A first or upper end of dampening member 126 may be connected to plate or panel 124 pivotably attached to the front face of leaning pad 104. A second or lower end of the dampening member may be connected to frame cross member 119 between longitudinal frame members 115. The dampening member reduces vertical impact forces to the leaning pad and operator when the stand on mower encounters bumps on the ground surface.

In the second embodiment shown in FIGS. 3A and 3B, stand on mower operator station 103 also may include a plurality of linkages such as pivot arms 132 for stabilizing the vertical motion of leaning pad 104. For example, each pivot arm 132 may have a first end pivotably connected to plate or panel 124 on the front face of leaning pad 104, and a second end pivotably connected to bracket 140 attached to control console support frame 134.

In the embodiment of FIGS. 3A and 3B, stand on mower operator station 103 may include dampening member 126 that also provides limited vertical movement and pivoting of foot platform 111 along with the leaning pad 104. A linkage may be provided between plate or panel 124 and the support bracket for foot platform 111. The linkage may include vented plate 144 in front of the engine.

In the second embodiment, FIG. 3A shows stand on mower operator station 103 in a first unpivoted position, and FIG. 2B shows stand on mower operator station 102 in a second pivoted position.

Having described the preferred embodiment, it will become apparent that various modifications can be made without departing from the scope of the invention as defined in the accompanying claims.

The invention claimed is:

1. A stand on mower operator station comprising: a leaning pad having an upright position on a stand on mower; a dampening member connecting the leaning pad to a frame member of the stand on mower for shock absorption by providing limited vertical movement of the leaning pad, further comprising a plurality of pivot arms pivotably extending between the leaning pad and a control console support frame.

2. The stand on mower operator station of claim 1 further comprising a foot platform attached to the leaning pad and having limited vertical movement along with the leaning pad.

3. The stand on mower operator station of claim 1 further including a plate attached to a front face of the leaning pad.

4. A stand on mower operator station comprising: a leaning pad having an upright position on a stand on mower; a foot platform connected to the leaning pad; the leaning pad and foot platform moving vertically together to absorb shocks encountered by the stand on mower, further comprising a plurality of pivot arms pivotably extending between the leaning pad and a control console support frame.

5. The stand on mower operator station of claim 4 further comprising a dampening member connected to the leaning pad and a frame cross member of the stand on mower.

6. The stand on mower operator station of claim 4 wherein the leaning pad and foot platform may pivot together on a horizontal axis of the stand on mower.

7. A stand on mower operator station comprising:
a foot platform connected to a plate on a forward face of a leaning pad;
a pair of control levers pivotably mounted to a control console support frame on each side of the leaning pad;
a plurality of pivot arms connecting the plate to the control console support frame; and
a dampening member connected between the plate and a frame member.

8. A stand on mower operator station of claim 7 wherein the dampening member is a coil spring over a shock absorber.

9. The stand on mower operator station of claim 7 further comprising a plurality of rollers on the leaning pad engaging a plurality of curved slots in the plate.

* * * * *